United States Patent
Chen et al.

(10) Patent No.: US 10,820,256 B2
(45) Date of Patent: Oct. 27, 2020

(54) DYNAMIC WIRELESS-CLIENT DISTRIBUTION ACROSS RADIO BANDS

(71) Applicant: ARRIS Enterprises LLC, Suwanee, GA (US)

(72) Inventors: Wen Chen, San Jose, CA (US); Wenge Ren, Sunnyvale, CA (US); Qingfeng Wang, Cupertino, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/148,034

(22) Filed: Oct. 1, 2018

(65) Prior Publication Data

US 2020/0107243 A1    Apr. 2, 2020

Related U.S. Application Data

(60) Provisional application No. 62/566,329, filed on Sep. 30, 2017.

(51) Int. Cl.
*H04W 40/34* (2009.01)
*H04W 40/24* (2009.01)
(Continued)

(52) U.S. Cl.
CPC ........... *H04W 40/34* (2013.01); *H04W 40/12* (2013.01); *H04W 40/246* (2013.01); *H04W 40/248* (2013.01); *H04W 84/12* (2013.01)

(58) Field of Classification Search
CPC . H04W 40/34; H04W 40/246; H04W 40/248; H04W 40/12; H04W 84/12; H04W 48/14; H04W 48/16; H04W 48/20
See application file for complete search history.

(56) References Cited

U.S. PATENT DOCUMENTS

| 2009/0047960 A1* | 2/2009 | Gunnarsson | H04W 36/0058 455/436 |
| 2012/0014267 A1* | 1/2012 | Gomes | H04W 36/0088 370/252 |

(Continued)

OTHER PUBLICATIONS

"LB 203 Comment Resolution for Miscellaneous part 5," IEEE P802.11 Wireless LANs standards committe document: IEEE 802.11-14/1124r0, Sep. 1, 2014.
(Continued)

*Primary Examiner* — Mohamed A Kamara
(74) *Attorney, Agent, or Firm* — Steven Stupp; Stewart Wiener (57) ABSTRACT

During disclosed communication techniques, an electronic device (such as an access point) may receive one or more packets from another electronic device, where the other electronic device has an established connection or association with the electronic device, and the one or more packets are communicated using a first band of frequencies. Then, the electronic device may determine to recommend a basic service set (BSS) transition from the first band of frequencies to at least a second band of frequencies. Moreover, the electronic device may provide a request packet to the other electronic device with a recommendation with one or more candidates for the BSS transition, such as a channel in the second band of frequencies. Next, the electronic device may receive a response packet from the other electronic device, where the response packet indicates a remedial action of the other electronic device in response to the request packet.

20 Claims, 5 Drawing Sheets

(51) Int. Cl.
*H04W 40/12* (2009.01)
*H04W 84/12* (2009.01)

(56) References Cited

U.S. PATENT DOCUMENTS

| | | | |
|---|---|---|---|
| 2013/0182611 A1* | 7/2013 | Kneckt | H04W 36/0061 370/255 |
| 2014/0228031 A1* | 8/2014 | Masini | H04W 36/0083 455/436 |
| 2015/0350974 A1* | 12/2015 | Patil | H04W 36/0083 370/331 |
| 2017/0013493 A1* | 1/2017 | HomChaudhuri | H04W 40/12 |
| 2019/0159114 A1* | 5/2019 | McCann | H04W 48/16 |

OTHER PUBLICATIONS

A. Sarma, et al., "Context Aware Inter-BSS Handoff in IEEE 802.11 Networks: Efficient Resource Utilization and Performance Improvement," Wireless Personal Communications, vol. 77(4), Aug. 2014, pp. 2587-2614.

G.O. Fernandes, "Load balancing via inter-frequency handovers in LTE networks," Masters Thesis, Instituto Superior Técnico, Lisbon, Portugal, Feb. 2015.

D. Ali, et al., "Automatic Handover Control for Distributed Load Balancing in Mobile Communication Network," ArXiv: 1605.01228, May 4, 2016, pp. 1-15.

\* cited by examiner

DYNAMIC WIRELESS-CLIENT DISTRIBUTION ACROSS RADIO BANDS

CROSS REFERENCE TO RELATED APPLICATIONS

This application claims priority under 35 U.S.C. 119(e) to U.S. Provisional Application Ser. No. 62/566,329, entitled "Dynamic Wireless-Client Distribution Across Radio Bands," by Wen Chen, Wenge Ren and Qingfeng Wang, filed on Sep. 30, 2017, the contents of which are herein incorporated by reference.

BACKGROUND

Field

The described embodiments relate to techniques for dynamically distributing wireless clients across radio bands in a wireless local area network (WLAN).

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

Typically, in a WLAN based on an IEEE 802.11 standard, one or more electronic devices (which are sometimes referred to as 'stations,' 'client devices,' or 'recipient electronic devices') are distributed across available bands of frequencies (which are sometimes referred to as 'radio bands') when they associate with an access point. Notably, during 'band balance' or 'band balancing,' an access point may steer an electronic device to radio band A by withholding a number of probe and authentication responses in radio band B. In order to perform such band balancing, the access point usually must have received wireless signals from the electronic device (such as probe requests) in multiple bands of frequencies, e.g., 2.4 and 5 GHz, and the received wireless signals need to have reasonable or sufficient signal strength in a targeted band of frequencies.

However, even though an electronic device may have the ability to communicate in multiple bands of frequencies, an access point may not always receive wireless signals from the electronic device in all of these bands of frequencies during association. Thus, an access point may not know that the electronic device is capable of communicating in, e.g., a 5-GHz band of frequencies. Alternatively, the wireless signals from the electronic device in the 5-GHz band of frequencies may be too weak during association, e.g., the electronic device may initially be further away from the access point. Moreover, some electronic devices may not respond to association-time band balancing. Furthermore, if band balancing is only performed during association, it may be difficult for an access point to respond to a dynamically changing wireless environment.

These difficulties with existing band-balance approaches may adversely impact the communication performance in a WLAN. For example, one radio band (such as 2.4 GHz) may become congested, which can degrade the throughput and the capacity.

SUMMARY

A described embodiment relates to an electronic device (such as an access point). This electronic device includes an interface circuit that wirelessly communicates with another electronic device. During operation, the electronic device receives, at the interface circuit, one or more packets or frames associated with the other electronic device, where the other electronic device has an established connection or association with the electronic device, and where the one or more packets or frames are associated with a first band of frequencies. Based at least in part on this communication, the electronic device may determine to recommend a basic service set (BSS) transition from the first band of frequencies to at least a second band of frequencies. For example, the electronic device may determine that there is a reduction in channel capacity in the first band of frequencies and/or that there is an increase in the client count in the first band of frequencies. Then, the electronic device provides, from the interface circuit, a request packet or frame intended for the other electronic device with the recommendation with one or more candidates for the BSS transition (such as a channel in the second band of frequencies), where the one or more candidates are included in the second band of frequencies. Next, the electronic device receives, at the interface circuit, a response packet or frame associated with the other electronic device, where the response packet or frame indicates a remedial action of the other electronic device in response to the request packet or frame.

In some embodiments, the request packet or frame includes a BSS transition management (BTM) request and the response packet or frame includes a BTM response. Moreover, the remedial action may indicate acceptance of one of the one or more candidates, rejection of the one or more candidates, a reason for the rejection, and/or a null response.

Moreover, the recommendation may be based at least in part on: support, by the other electronic device, for communication in the second band of frequencies and/or communication performance in the second band of frequencies relative to the first band of frequencies (such as relative RSSI, throughput and/or available capacity). For example, if the available capacity is greater in the second band of frequencies, the electronic device may determine to make the recommendation. Alternatively, if the available capacities are equal (or approximately equal, such as within 1, 5, 10 or 25% of each other) and the RSSI is greater in the second band of frequencies, the electronic device may determine to make the recommendation.

Note that support, by the other electronic device, for communication in the second band of frequencies may be based at least in part on: information that indicates a communication capability of the other electronic device that was received when the other electronic device associated with the electronic device and/or frequency-band capability information about the other electronic device that was received from one or more additional electronic devices (such as other access points). In some embodiments, the electronic device may request that the other electronic device indicate whether it supports communication in the second band of frequencies. For example, the electronic device may provide, from the interface circuit, a radio measurement request packet or frame (such as in the first or second band of frequencies) that is intended for the other electronic device, which may cause the other electronic device to transmit a probe request packet or frame in the second band of frequencies. If the electronic device subsequently receives, at the interface circuit, a probe request packet or frame in the second band of frequencies that is associated with the other electronic device, then the electronic device may confirm that the other electronic device supports communication in the second band of frequencies.

Another embodiment provides a computer-readable storage medium for use with the electronic device. This computer-readable storage medium may include program instructions that, when executed by the electronic device, causes the electronic device to perform at least some of the aforementioned operations.

Another embodiment provides a method for providing a recommendation. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Communication techniques are described. During the communication techniques, an electronic device (such as an access point) may receive one or more packets or frames from another electronic device, where the other electronic device has an established connection or association with the electronic device, and the one or more packets are communicated using a first band of frequencies. Based changes in the communication environment and/or additional information about communication capabilities of the other electronic device, the electronic device may determine to recommend a BSS transition from the first band of frequencies to at least a second band of frequencies. Then, the electronic device may provide a request packet or frame to the other electronic device with a recommendation with one or more candidates for the BSS transition (such as a channel in the second band of frequencies), where the one or more candidates are in the second band of frequencies. Next, the electronic device may receive a response packet or frame from the other electronic device, where the response packet or frame indicates a remedial action of the other electronic device in response to the request packet or frame.

By facilitating a BSS transition at times after association, the communication techniques may allow the electronic device to dynamically perform band balancing. This capability may reduce congestion and improve the communication performance (such as capacity or throughput) in the first band of frequencies and/or the second band of frequencies. Consequently, the communication techniques may improve the user experience and customer satisfaction of users of the electronic device and/or the other electronic device.

In the discussion that follows, electronic devices or components in a system communicate packets or frames in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth (from the Bluetooth Special Interest Group of Kirkland, Wash.), and/or another type of wireless interface (such as another wireless-local-area-network interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

Figure 1:
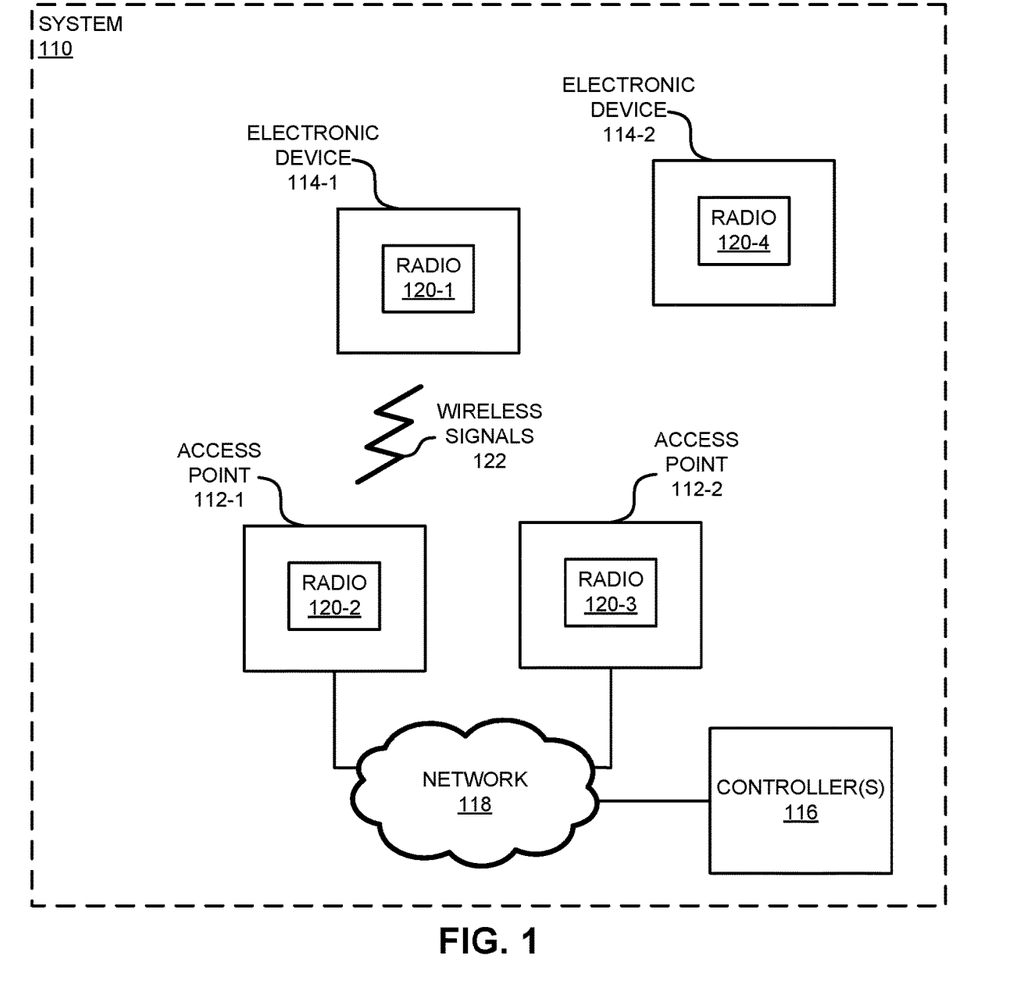
FIG. 1 is a block diagram illustrating an example of a system in accordance with an embodiment of the present disclosure.

We now describe some embodiments of the communication techniques. FIG. 1 presents a block diagram illustrating an example of a system 110, which may include components, such as: one or more access points 112, one or more electronic devices 114 (such as cellular telephones, stations, another type of electronic device, etc.), and one or more optional controllers 116. In system 110, the one or more access points 112 may wirelessly communicate with the one or more electronic devices 114 using wireless communication that is compatible with an IEEE 802.11 standard. Thus, the wireless communication may occur in, e.g., a 2.4 GHz, a 5 GHz and/or a 60 GHz band of frequencies. (Note that IEEE 802.11ad communication over a 60 GHz frequency band is sometimes referred to as 'WiGig.' In the present discussion, these embodiments also encompassed by 'Wi-Fi.') However, a wide variety of frequency bands may be used. Moreover, the one or more access points 112 may communicate with the one or more optional controllers 116 via network 118 (such as the Internet, an intra-net and/or one or more dedicated links). Note that the one or more optional controllers 116 may be at the same location as the other components in system 110 or may be located remotely (i.e., at a different location). Moreover, note that the one or more access points 112 may be configured and/or managed by the one or more optional controllers 116. Furthermore, note that the one or more access points 112 may provide access to network 118 (e.g., via an Ethernet protocol), and may be a physical access point or a virtual or 'software' access point that is implemented on a computer or an electronic device. While not shown in FIG. 1, there may be additional components or electronic devices, such as a router.

Additionally, as noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 5:
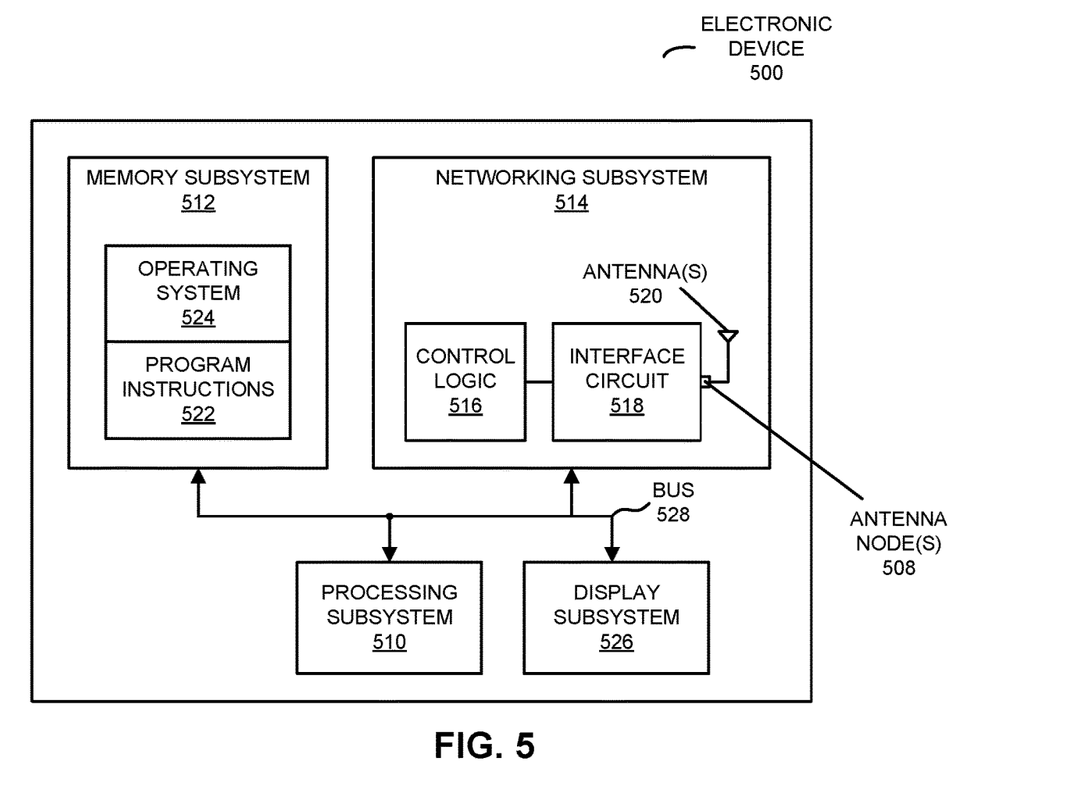
FIG. 5 is a block diagram illustrating an example of an electronic device in accordance with an embodiment of the present disclosure.

As described further below with reference to FIG. 5, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-1 in electronic device 114-1. These wireless signals are received by radio 120-2 in at least one of the one or more access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, the communication techniques may be performed by components in system 110. Notably, access points 112 (such as access point 112-1) may perform band balancing after they are associated with electronic devices 114. For example, based at least in part on communication with one or more other access points 112 and/or with at least one of electronic devices 114 (such as electronic device 114-1) after association, access point 112-1 may determine that electronic device 114-1 is capable of communicating in more than one bands of frequencies. In some embodiments, the one or more other access points 112 provide information based at least in part on a history of frequency-band communication with electronic device 114-1. This information may include whether electronic device 114-1 is capable of communicating in a second band of frequencies (such as, e.g., 5 GHz) and/or an RSSI of electronic device 114-1 (such as an average or a mean RSSI) in the second band of frequencies.

Alternatively or additionally, access point 112-1 may determine that electronic device 114-1 is capable of communicating in the second band of frequencies when it associated with electronic device 114-1 and/or by requesting that electronic device 114-1 indicate its capabilities in this regard after association with access point 112-1. For example, access point 112-1 may provide a radio measurement request packet or frame (such as in the first or second band of frequencies) to electronic device 114-1, which may cause the electronic device 114-1 to transmit a probe request packet or frame in the second band of frequencies. If access point 112-1 subsequently receives, at the interface circuit, a probe request packet or frame in the second band of frequencies that is associated with electronic device 114-1, then access point 112-1 may confirm that electronic device 114-1 supports communication in the second band of frequencies.

Furthermore, in some embodiments, based at least in part on communication between access point 112-1 and electronic device 114-1 in a first band of frequencies, access point 112-1 may determine to recommend a BSS transition to electronic device 114-1 from a first band of frequencies (such as, e.g., 2.4 GHz) to the second band of frequencies (such as, e.g., 5 GHz). For example, if electronic device 114-1 is capable of communicating in the second band of frequencies, supports BTM (e.g., supports IEEE 802.11k) and the capacity of electronic device 114-1 is greater in the second band of frequencies than the first band of frequencies (e.g., more than 1, 3, 5, 10 or 25% greater), access point 112-1 may determine to make the recommendation. Alternatively, if electronic device 114-1 is capable of communicating in the second band of frequencies, supports BTM, the capacities of electronic device 114-1 in the first and second bands of frequencies are equal (or approximately equal, such as within 1, 5, 10 or 25% of each other) and the RSSI of electronic device 114-1 is greater in the second band of frequencies than the first band of frequencies, access point 112-1 may determine to make the recommendation. More generally, the determination to make a recommendation for a BSS transition may be based at least in part on a variety of communication metrics in the first and/or the second band of frequencies.

Access point 112-1 may make the recommendation by providing, to electronic device 114-1, a request packet or frame with the recommendation with one or more candidates for the BSS transition (such as one or more channels in the second band of frequencies), where the one or more candidates are included in the second band of frequencies. Next, access point 112-1 may receive, from electronic device 114-1, a response packet or frame that indicate a remedial action of electronic device 114-1 in response to the request packet or frame. For example, access point 112-1 may provide a BTM request with the recommendation to electronic device 114-1, and electronic device 114-1 may provide a BTM response with the remedial action. Moreover, the remedial action may indicate acceptance of one of the one or more candidates, rejection of the one or more candidates, a reason for the rejection, and/or a null response.

In this way, the communication techniques may allow access points 112 to perform dynamic band balancing. This may improve the communication performance in sy stem 110.

In the described embodiments, processing a frame or a packet in one of electronic devices 114 and/or one of the one or more access points 112 may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114, and/or the one or more optional controllers 116. As another example, in another embodiment, different electronic devices are transmitting and/or receiving frames or packets.

Figure 2:
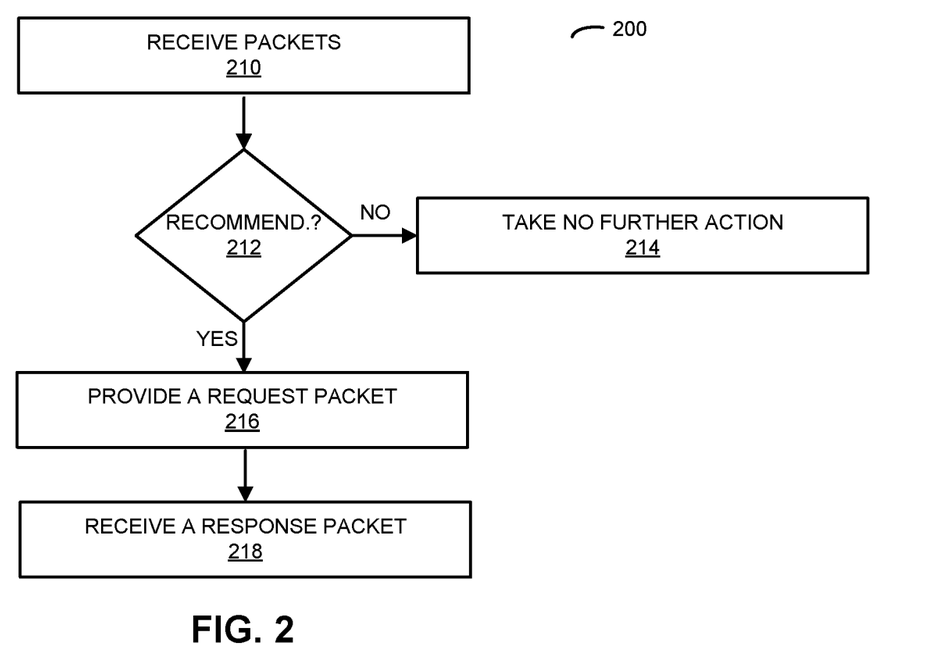
FIG. 2 is a flow diagram illustrating an example method for providing a recommendation in the system in FIG. 1 in accordance with an embodiment of the present disclosure.

We now describe embodiments of the method. FIG. 2 presents a flow diagram illustrating an example method 200 for providing a recommendation. Moreover, method 200 may be performed by an electronic device, such as one of the one or more access points 112 in FIG. 1, e.g., access point 112-1. During operation, the electronic device may receive one or more packets (operation 210) or frames associated with another electronic device, where the other electronic device may have an established connection or association with the electronic device, and the one or more packets or frames may be associated with a first band of frequencies.

Based at least in part on this communication, additional information about communication capabilities of the other electronic device, and/or instructions from a network operator or mobile-network operator (such as one or more network communication-performance criteria, e.g., a desired throughput, utilization, channel capacity and/or another band-balancing criterion in a given band of frequencies), the electronic device may determine (operation 212) whether to recommend a BSS transition from the first band of frequencies to at least a second band of frequencies. Note that the recommendation may be based at least in part on: support, by the other electronic device, for communication in the second band of frequencies and/or communication performance in the second band of frequencies relative to the first band of frequencies (such as relative RSSI, throughput and/or capacity). For example, if the other electronic device supports communication in the second band of frequencies, supports BTM and the capacity of the other electronic device is greater in the second band of frequencies, the electronic device may determine to make the recommendation. Alternatively, if the other electronic device supports communication in the second band of frequencies, supports BTM, the capacities are equal or approximately equal and the RSSI of the other electronic device is greater in the second band of frequencies, the electronic device may determine to make the recommendation.

Note that support, by the other electronic device, for communication in the second band of frequencies may be based at least in part on: information that indicates a communication capability of the other electronic device that was received when the other electronic device associated with the electronic device and/or frequency-band capability information about the other electronic device that was received from one or more additional electronic devices (such as other access points). In some embodiments, the electronic device may request that the other electronic device indicate whether it supports communication in the second band of frequencies. For example, the electronic device may provide, from the interface circuit, a radio measurement request packet or frame (such as in the first or second band of frequencies) intended for the other electronic device, which may cause the other electronic device to transmit a probe request packet or frame in the second band of frequencies. If the electronic device subsequently receives, at the interface circuit, a probe request packet or frame in the second band of frequencies that is associated with the other electronic device, then the electronic device may confirm that the other electronic device supports communication in the second band of frequencies. If the electronic device decides to provide a recommendation (operation 212), the electronic device may provide a request packet (operation 216) or frame intended for the other electronic device with the recommendation with one or more candidates for the BSS transition (such as a channel in the second band of frequencies), where the one or more candidates are included the second band of frequencies. Next, the electronic device may receive a response packet (operation 218) or frame associated with the other electronic device, where the response packet or frame indicates a remedial action of the other electronic device in response to the request packet or frame.

Otherwise (operation 212), the electronic device may take no further action (operation 214).

In some embodiments, the request packet or frame includes a BTM request and the response packet or frame includes a BTM response. Moreover, the remedial action may indicate: acceptance of one of the one or more candidates, rejection of the one or more candidates, a reason for the rejection, and/or a null response.

Figure 3:
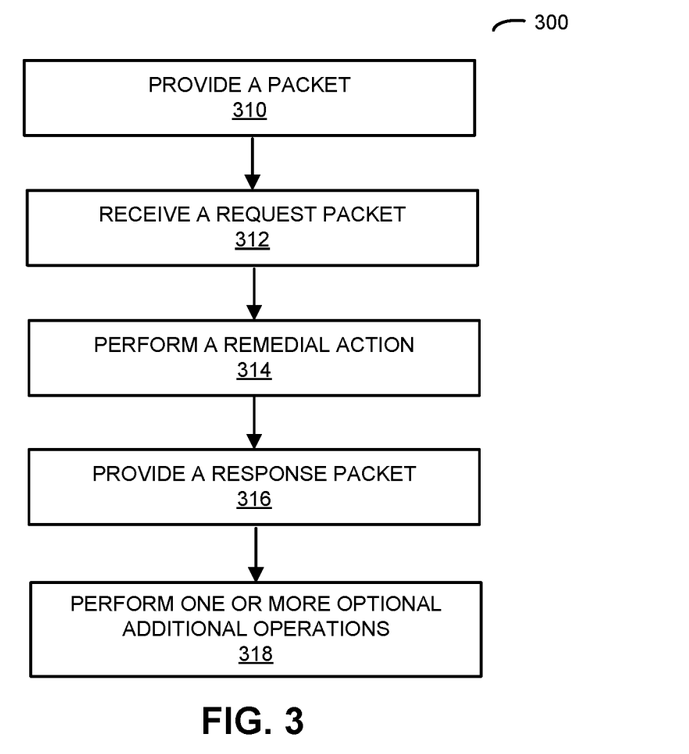
FIG. 3 is a flow diagram illustrating an example method for receiving a recommendation in the system in FIG. 1 in accordance with an embodiment of the present disclosure.

FIG. 3 presents a flow diagram illustrating an example method 300 for receiving a recommendation. Moreover, method 300 may be performed by an electronic device, such as one of the one or more electronic devices 114 in FIG. 1, e.g., electronic device 114-1. During operation, the electronic device may provide one or more packets (operation 310) or frames intended for another electronic device (such as access point 112-1 in FIG. 1, where the electronic device may have an established connection or association with the other electronic device, and the one or more packets or frames may be associated with a first band of frequencies.

Then, the electronic device may receive a request packet (operation 312) or frame, associated with the other electronic device, with a recommendation with one or more candidates for a BSS transition from the first band of frequencies to at least a second band of frequencies (such as a channel in the second band of frequencies), where the one or more candidates are included the second band of frequencies.

Moreover, in response to the request packet or frame, the electronic device may perform a remedial action (operation 314). For example, the remedial action may include: acceptance of one of the one or more candidates or rejection of the one or more candidates.

Next, the electronic device may provide a response packet (operation 316) or frame intended for the other electronic device, where the response packet or frame indicates the remedial action of the electronic device in response to the request packet or frame. For example, the response packet or frame may indicate: acceptance of one of the one or more candidates, rejection of the one or more candidates, a reason for the rejection, and/or a null response.

In some embodiments, the electronic device performs one or more optional additional operations (operation 318). For example, when providing the packet or frame (operation 310), the electronic device may provide information about communication performance intended for the other electronic device (such as an RSSI, a throughput, a capacity, etc.).

Moreover, prior to receiving the packet or frame with the recommendation (operation 312), the electronic device may receive a radio measurement request packet or frame (such as in the first or second band of frequencies) associated with the other electronic device. In response, the electronic device may provide a probe request packet or frame intended for the other electronic device in the second band of frequencies, which indicates whether the electronic device supports communication in the second band of frequencies. For example, the request packet or frame may include a BTM request and the response packet or frame may include a BTM response.

In some embodiments of methods 200 (FIG. 2) and/or 300, there may be additional or fewer operations. Moreover, there may be one or more different operations. Furthermore, the order of the operations may be changed, and/or two or more operations may be combined into a single operation.

Figure 4:
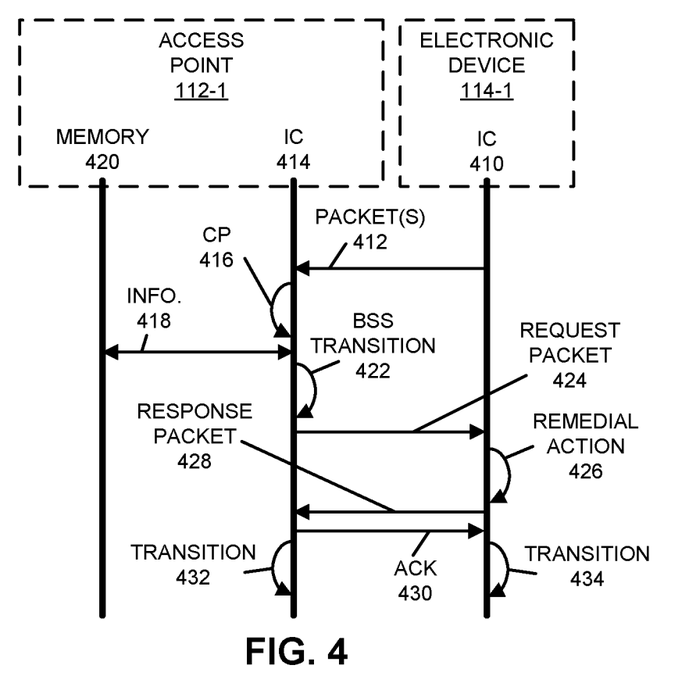
FIG. 4 is a drawing illustrating an example of communication among electronic devices in FIG. 1 in accordance with an embodiment of the present disclosure.

FIG. 4 presents a drawing illustrating an example of communication among access point 112-1 and electronic device 114-1. In FIG. 4, an interface circuit (IC) 410 in electronic device 114-1 may provide or transmit one or more packets 412 (or frames) to access point 112-1, where electronic device 114-1 is already associated with access point 112-1, and where packet 412 is communicated in a first band of frequencies (such as 2.4 GHz).

After receiving packet 412, interface circuit 414 in access point 112-1 may determine communication performance (CP) 416 of the communication between access point 112-1 and electronic device 114-1 (such as communication performance in the first band of frequencies and/or in the second band of frequencies). Moreover, interface circuit 414 may access stored information 418 in memory 420 in access point 112-1 about communication capabilities of electronic device 114-1 (which may have been received from another electronic device, such as another access point) and/or instructions from a network operator or mobile-network operator.

Next, interface circuit 414 may determine whether to recommend a BSS transition 422 from the first band of frequencies to at least the second band of frequencies.

When interface circuit 414 determines to make the recommendation, interface circuit 414 may provide or transmit a request packet 424 (or frame) to electronic device 110-1. After receiving request packet 424, interface circuit 410 may perform a remedial action 426, such as accepting one of the one or more candidates. For example, one of the one or more candidates may include a channel in the second band of frequencies.

Moreover, interface circuit 410 may provide or transmit a response packet 428 (or frame) to access point 112-1, which may indicate remedial action 426 of electronic device 114-1 in response to request packet 424. After receiving response packet 428, interface circuit 414 may provide or transmit an acknowledgment (ACK) 430 to electronic device 114-1. Then, interface circuit 414 may transition 432 a connection with electronic device 11401 to, e.g., the channel in the second band of frequencies. Furthermore, after receiving acknowledgment 430, interface circuit 410 may transition 432 the connection with access point 112-1 to, e.g., the channel in the second band of frequencies.

Otherwise, when interface circuit 414 determines not to recommend a BSS transition 422, access point 112-1 may take no further action.

While FIG. 4 illustrates communication between components and/or between access point 112-1 and electronic device 114-1 using single-ended or double-sided arrows corresponding, respectively, to unilateral or bilateral communication, in general a given communication operation may involve unilateral or bilateral communication.

In some embodiments, in the communication techniques an access point may make dynamic recommendations to a client device or station after association if the station supports communication in multiple bands of frequencies and BTM, and based at least in part on relative communication performance of the station in the multiple bands of frequencies.

For example, a station may be connected or associated with an access point on a 2.4 GHz radio and may support BTM. If the access point determines that the station supports communication in, e.g., the 5-GHz band of frequencies, and based at least in part on the relative communication performance, the access point may use BTM to recommend that the station transition to a channel in, e.g., the 5-GHz band of frequencies.

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 5 presents a block diagram illustrating an example of an electronic device 500 in accordance with some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, graphical processor units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory (which collectively or individually are sometimes referred to as a 'computer-readable storage medium'). In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and/or one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520.) For example, networking subsystem 514 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 500 may be adapted or changed using pattern shapers (such as reflectors) in one or more antennas 520 (or antenna elements), which can be independently and selectively electrically coupled to ground to steer the transmit antenna radiation pattern in different directions. Thus, if one or more antennas 520 includes N antenna-radiation-pattern shapers, the one or more antennas 520 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting frames and/or scanning for frames transmitted by other electronic devices.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, an access point, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 are included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

While the preceding discussion illustrated the communication techniques using communication in particular bands of frequencies, other bands of frequencies may be used, such as bands of frequencies corresponding to Long Term Evolution (LTE) and/or Citizen Band Radio Service (CBRS).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna; and
an interface circuit, coupled to the antenna, configured to wirelessly communicate with another electronic device, wherein the interface circuit is configured to perform one or more operations comprising:
receiving, at the interface circuit, one or more packets or frames associated with the other electronic device, wherein the other electronic device has an established connection or association with the electronic device in a wireless local area network (WLAN), wherein the connection or association is established via exchange of an association request and an association response, and wherein the one or more packets or frames are associated with a first band of frequencies;
determining, based at least in part on a communication performance associated with the one or more packets or frames, information about a communication capability of the other electronic device, or both, to recommend a basic service set (BSS) transition from the first band of frequencies to at least a second band of frequencies;
providing, from the interface circuit, a request packet or frame addressed to the other electronic device that comprises a recommendation with one or more candidates for the BSS transition, wherein the one or more candidates are included in the second band of frequencies; and
receiving, at the interface circuit, a response packet or frame associated with the other electronic device, wherein the response packet or frame indicates a remedial action of the other electronic device in response to the request packet or frame.

2. The electronic device of claim 1, wherein the request packet or frame comprises a BSS transition management (BTM) request and the response packet or frame comprises a BTM response.

3. The electronic device of claim 1, wherein the remedial action indicates at least one of: acceptance of one of the one or more candidates, rejection of the one or more candidates, a reason for the rejection, or a null response.

4. The electronic device of claim 1, wherein the one or more candidates comprises a channel in the second band of frequencies.

5. The electronic device of claim 1, wherein the determination is based at least in part on: a channel capacity in the first band of frequencies relative to a channel capacity in the second band of frequencies; a client count in the first band of frequencies relative to a client count in the second band of frequencies; or, when capacities in the first band of frequencies and the second band of frequencies are approximately equal, a received signal strength indicator (RSSI) in the first band of frequencies relative to an RSSI in the second band of frequencies.

6. The electronic device of claim 1, wherein the determination is based at least in part on at least one of: support, by the other electronic device, for communication in the second band of frequencies, or communication performance in the second band of frequencies relative to the first band of frequencies.

7. The electronic device of claim 6, wherein support, by the other electronic device, for communication in the second band of frequencies is based at least in part on at least one of: information that indicates the communication capability of the other electronic device that was received when the other electronic device associated with the electronic device, or frequency-band capability information about the other electronic device that was received from one or more additional electronic devices.

8. The electronic device of claim 1, wherein the one or more operations comprise
requesting, from the interface circuit, that the other electronic device indicate whether the other electronic device supports communication in the second band of frequencies; and
receiving, at the interface circuit, a response associated with the other electronic device that indicates that the other electronic device supports communication in the second band of frequencies.

9. The electronic device of claim 1, wherein the one or more operations comprise:
providing, from the interface circuit, a radio measurement request packet or frame addressed to the other electronic device, which is associated with the first band of frequencies or the second band of frequencies;
receiving, at the interface circuit, a probe request packet or frame associated with the other electronic device, and which is associated with the second band of frequencies; and
confirming, based at least in part on the receiving of the probe request packet or frame, that the other electronic device supports communication in the second band of frequencies.

10. A non-transitory computer-readable storage medium for use in conjunction with an electronic device, the computer-readable storage medium storing program instructions, wherein, when executed by the electronic device, the program instructions cause the electronic device to perform one or more operations comprising:
receiving, at an interface circuit in the electronic device, one or more packets or frames associated with the other electronic device, wherein the other electronic device has an established connection or association with the electronic device in a wireless local area network (WLAN), wherein the connection or association is established via exchange of an association request and an association response, and wherein the one or more packets or frames are associated with a first band of frequencies;
determining, based at least in part on a communication performance associated with the one or more packets or frames, information about a communication capability of the other electronic device, or both, to recommend a basic service set (BSS) transition from the first band of frequencies to at least a second band of frequencies;
providing, from the interface circuit, a request packet or frame addressed to the other electronic device that comprises a recommendation with one or more candidates for the BSS transition, wherein the one or more candidates are included in the second band of frequencies; and
receiving, at the interface circuit, a response packet or frame associated with the other electronic device, wherein the response packet or frame indicates a remedial action of the other electronic device in response to the request packet or frame.

11. The non-transitory computer-readable storage medium of claim 10, wherein the request packet or frame comprises a BSS transition management (BTM) request and the response packet or frame comprises a BTM response.

12. The non-transitory computer-readable storage medium of claim 10, wherein the remedial action indicates at least one of: acceptance of one of the one or more candidates, rejection of the one or more candidates, a reason for the rejection, or a null response.

13. The non-transitory computer-readable storage medium of claim 10, wherein the one or more candidates comprises a channel in the second band of frequencies.

14. The non-transitory computer-readable storage medium of claim 10, wherein the determination is based at least in part on: a channel capacity in the first band of frequencies relative to a channel capacity in the second band of frequencies; a client count in the first band of frequencies relative to a client count in the second band of frequencies; or, when capacities in the first band of frequencies and the second band of frequencies are approximately equal, a received signal strength indicator (RSSI) in the first band of frequencies relative to an RSSI in the second band of frequencies.

15. The non-transitory computer-readable storage medium of claim 10, wherein the determination is based at least in part on at least one of: support, by the other electronic device, for communication in the second band of frequencies, or communication performance in the second band of frequencies relative to the first band of frequencies.

16. The non-transitory computer-readable storage medium of claim 15, wherein support, by the other electronic device, for communication in the second band of frequencies is based at least in part on at least one of: information that indicates the communication capability of the other electronic device that was received when the other electronic device associated with the electronic device, or frequency-band capability information about the other electronic device that was received from one or more additional electronic devices.

17. The non-transitory computer-readable storage medium of claim 10, wherein the one or more operations comprise:
requesting, from the interface circuit, that the other electronic device indicate whether the other electronic device supports communication in the second band of frequencies; and
receiving, at the interface circuit, a response associated with the other electronic device that indicates that the other electronic device supports communication in the second band of frequencies.

18. A method for providing a recommendation, comprising:
by an electronic device:
receiving, at an interface circuit in the electronic device, one or more packets or frames associated with the other electronic device, wherein the other electronic device has an established connection or association with the electronic device in a wireless local area network (WLAN), wherein the connection or association is established via exchange of an association request and an association response, and wherein the one or more packets or frames are associated with a first band of frequencies;

determining, based at least in part on a communication performance associated with the one or more packets or frames, information about a communication capability of the other electronic device, or both, to recommend a basic service set (BSS) transition from the first band of frequencies to at least a second band of frequencies;

providing, from the interface circuit, a request packet or frame addressed to the other electronic device that comprises the recommendation with one or more candidates for the BSS transition, wherein the one or more candidates are included in the second band of frequencies; and receiving, at the interface circuit, a response packet or frame associated with the other electronic device, wherein the response packet or frame indicates a remedial action of the other electronic device in response to the request packet or frame.

19. The method of claim 18, wherein the request packet or frame comprises a BSS transition management (BTM) request and the response packet or frame comprises a BTM response.

20. The method of claim 18, wherein the remedial action indicates at least one of: acceptance of one of the one or more candidates, rejection of the one or more candidates, a reason for the rejection, or a null response.

* * * * *